United States Patent
Ju et al.

(10) Patent No.: US 7,299,181 B2
(45) Date of Patent: Nov. 20, 2007

(54) HOMONYM PROCESSING IN THE CONTEXT OF VOICE-ACTIVATED COMMAND SYSTEMS

(75) Inventors: Yun-Cheng Ju, Bellevue, WA (US); David Ollason, Seattle, WA (US); Siddharth Bhatia, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 215 days.

(21) Appl. No.: 10/881,685

(22) Filed: Jun. 30, 2004

(65) Prior Publication Data

US 2006/0004571 A1    Jan. 5, 2006

(51) Int. Cl.
  *G10L 15/18*   (2006.01)
  *G10L 15/00*   (2006.01)

(52) U.S. Cl. ........................... 704/257; 704/275
(58) Field of Classification Search ............... None
  See application file for complete search history.

(56) References Cited

U.S. PATENT DOCUMENTS

| | | | | |
|---|---|---|---|---|
| 4,468,756 A | * | 8/1984 | Chan | 704/4 |
| 4,777,600 A | * | 10/1988 | Saito et al. | 715/535 |
| 5,729,659 A | * | 3/1998 | Potter | 704/270 |
| 6,067,520 A | * | 5/2000 | Lee | 704/270 |
| 6,094,634 A | * | 7/2000 | Yahagi et al. | 704/260 |
| 6,163,767 A | * | 12/2000 | Tang et al. | 704/231 |
| 6,269,335 B1 | * | 7/2001 | Ittycheriah et al. | 704/270 |
| 6,804,330 B1 | * | 10/2004 | Jones et al. | 379/88.01 |
| 6,925,154 B2 | * | 8/2005 | Gao et al. | 379/88.03 |
| 2002/0128831 A1 | * | 9/2002 | Ju et al. | 704/231 |
| 2003/0009335 A1 | * | 1/2003 | Schalkwyk et al. | 704/257 |

OTHER PUBLICATIONS

Mitjushin, Leonid. "An Agreement Corrector for Russian", International Conference on Computational Lingustics, 1996, pp. 776-781.*
Palopoli, L., Sacca, D., Ursino, D. "Semi-automatic, semantic discovery of properties from database schemes", Database Engineering and Applications Symposium 1998, pp. 244-253.*
Takahashi, M., Shinchu, T., Yoshimura, K., Shudo, K. "Processing Homonyms in the Kana-to-Kanji Conversion", International Conference on Computational Linguistics, 1996 vol. 2, pp. 1135-1138.*
A. Sethy et al. "A Syllable Based Approach for Improved Recognition of Spoken Names," ISCA Pronunciation Modeling and Lexicon Adaptation, 2002, pp. 1-4.

(Continued)

*Primary Examiner*—David Hudspeth
*Assistant Examiner*—Matthew J Sked
(74) *Attorney, Agent, or Firm*—Westman, Shamplin & Kelly, P.A.

(57) ABSTRACT

A computer-implemented method is disclosed for creating a grammar to be processed by a speech recognition engine in the context of a voice-activated command system. The method includes receiving a database containing a plurality of terms and identifying a set of terms that are pronounced the same but spelled differently. The method also includes placing a single term within the grammar to represent the set of terms.

19 Claims, 7 Drawing Sheets

OTHER PUBLICATIONS

F. Beaufays et al. "Learning Linguistically Valid Pronunciations from Acoustic Data," ISCA Archive EUROSPEECH 2003—8th European Conference on Speech Communication and Technology, pp. 1-4.

F. Beaufays et al. "Learning Name Pronunciations in Automatic Speech Recognition Systems," 15th IEEE International Conference on Tools With Artificial Intelligence, Nov. 1993, pp. 1-8.

N. Deshmukh et al. "Advances in Automatic Generation of Multiple Pronunciations for Proper Nouns," prepared for Speech Research Group, Texas Instruments, Institute for Signal and Information Processing, Sep. 1997, pp. 1-40.

"Nortel Networks Corporate Directory Dialer," 2003, Nortel Networks.

Dr. M. Spiegel "The Difficulties with Names," Speech Technology Magazine, Jun. 2003, pp. 1-5.

Llitjos, A. and Black, A.; "Evaluation and Collection of Proper Name Pronunciations Online," citeseer.ist.psu.edu/535078.html, pp. 247-254.

A. Llitjos. "Improving Pronunciation Accuracy of Proper Names with Language Origin Classes," Proceedings of the Seventh ESSLLI Student Session, 2002, pp. 1-17.

Y. Dong et al. *"Improved Name Recognition with User Modeling,"* in Proceedings of EUROSPEECH 2003, Geneva Switzerland, pp. 1-4.

Deshmukh, N. and Picone, J.; "Automatic Generation of N-best Proper Noun Pronunciations," Prepared for Speech Research Group, Texas Instruments, Inc. Institute for Signal and Information Processing Aug. 1996, pp. 1-44.

\* cited by examiner

HOMONYM PROCESSING IN THE CONTEXT OF VOICE-ACTIVATED COMMAND SYSTEMS

BACKGROUND OF THE INVENTION

The present invention generally pertains to voice-activated command systems. More specifically, the present invention pertains to methods for improving the accuracy of voice-dialing applications through processing of homonyms.

Homonyms pose unique challenges to voice-dialing applications; even beyond speech recognition accuracy problems. In many instances, known applications treat two names as collisions only if the spelling of the names is identical. Therefore, even with perfect speech recognition, it is not uncommon for known systems to ask a caller to make a selection from a plurality of terms having identical pronunciations but different spellings. Since the caller cannot "see" spelling differences over the phone, it becomes easy to understand why homonyms are prone to being a source of confusion and incorrect call transfers.

An example will help to further define the nature of challenges posed by homonyms to voice-dialing systems. For the purpose of illustration, it will be assumed that "craig" and "kraig" are pronounced the same. Under these circumstances, in the context of many voice-dialing systems, a caller will be presented with a voice prompt in the nature of "Are you looking for Craig or Kraig". Because the caller is essentially blind to the difference in spelling, there is a fifty percent chance that a caller seeking a connection to "kraig" will be connected to "craig", and vice versa. As the number of homonyms within a system increases, there are corresponding decreases in system connection accuracy and consistency.

Some voice-dialing solutions are configured to empower a caller to somehow distinguish between names having a common pronunciation utilizing an identifier other than spelling. For example, a caller might ask for "Mike Andersen". The system might include one listing for "Mike Andersen" and two listings for "Mike Anderson". Presented with this homonym scenario, known systems generally are not equipped to accurately determine which listing the caller desires. Some systems are configured to present additional identifying information in order to empower the caller to make an informed selection decision. For example, the system might pose a selection inquiry to the caller such as "Are you looking for Mike Anderson in building 6, Mike Anderson in building 7, or Mike Anderson in building 12?". Despite being ignorant of any differences in the spelling of Anderson, the caller can make a selection based on an alternate criteria (i.e., building location). In many cases, the caller will be more familiar with spelling differences than with a given set of additional identifying information.

SUMMARY OF THE INVENTION

Embodiments of the present invention pertain to a computer-implemented method for creating a grammar to be processed by a speech recognition engine in the context of a voice-activated command system. The method includes receiving a database containing a plurality of terms and identifying a set of terms that are pronounced the same but spelled differently. The method also includes placing a single term within the grammar to represent the set of terms.

DETAILED DESCRIPTION OF ILLUSTRATIVE EMBODIMENTS

I. Exemplary Environments

Various aspects of the present invention pertain to the processing of homonyms in context of voice-dialing applications. Embodiments of the present invention can be implemented in association with a call routing system, wherein a caller identifies with whom they would like to communicate and the call is routed accordingly. Embodiments can also be implemented in association with a voice message system, wherein a caller identifies for whom a message is to be left and the call or message is sorted and routed accordingly. Embodiments can also be implemented in association with a combination of call routing and voice message systems. It should also be noted that the present invention is not limited to call routing and voice message systems. These are simply examples of systems within which embodiments of the present invention can be implemented.

Prior to discussing embodiments of the present invention in detail, exemplary computing environments within which the embodiments and their associated systems can be implemented will be discussed.

Figure 1:
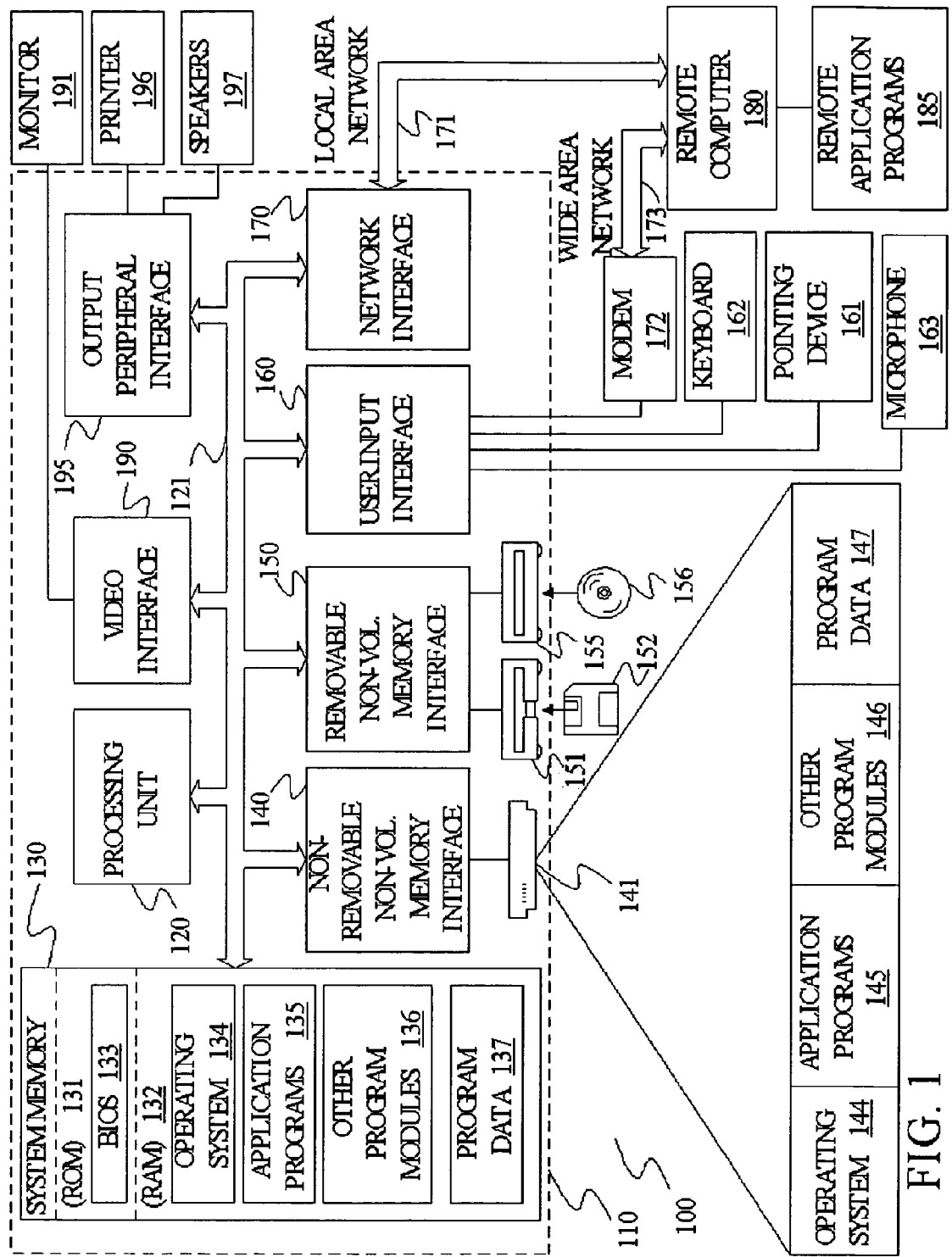
FIG. 1 is a block diagram representation of a general computing environment in which illustrative embodiments of the present invention may be practiced.

FIG. 1 illustrates an example of a suitable computing environment 100 within which embodiments of the present invention and their associated systems may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of illustrated components.

The present invention is operational with numerous other general purpose or special purpose computing system environments or configurations. Examples of well-known computing systems, environments, and/or configurations that may be suitable for use with the invention include, but are not limited to, personal computers, server computers, handheld or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices. Tasks performed by the programs and modules are described below and with the aid of figures. Those skilled in the art can implement the description and figures as processor executable instructions, which can be written on any form of a computer readable media.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

II. Voice-Dialing System

A. System Overview

Figure 2:
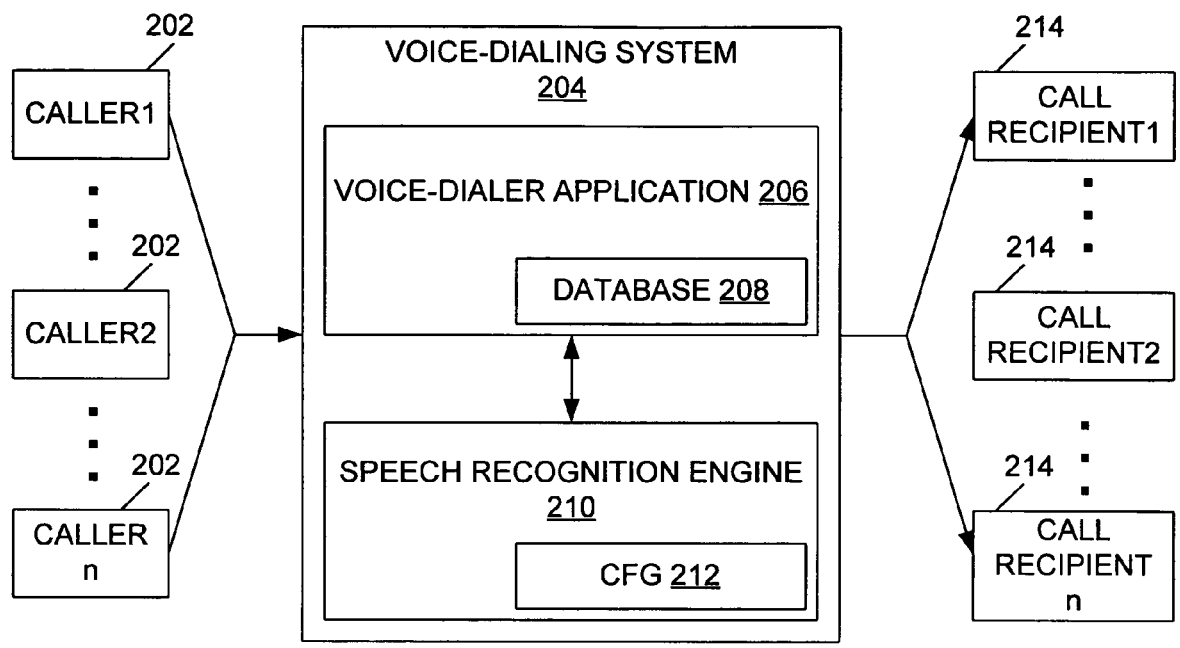
FIG. 2 is a schematic block representation of a voice-dialing system.

FIG. 2, in accordance with one aspect of the present invention, is a schematic block diagram of a voice-dialing system 204. System 204 is illustratively implemented within one of the computing environments discussed in association with FIG. 1. System 204 includes a voice-dialer application 206 having access to a database of callers 208. System 204 also includes a speech recognition engine 210 having a context-free-grammar (CFG) 212. It should be noted that application 206, database 208, speech recognition engine 210, and CFG 212 need not necessarily be implemented within the same computing environment. For example, application 206 and its associated database 208 could be operated from a first computing device that is in communication via a network with a different computing device operating recognition engine 210 and its associated CFG 212. These and other distributed implementations are within the scope of the present invention.

Figure 3:
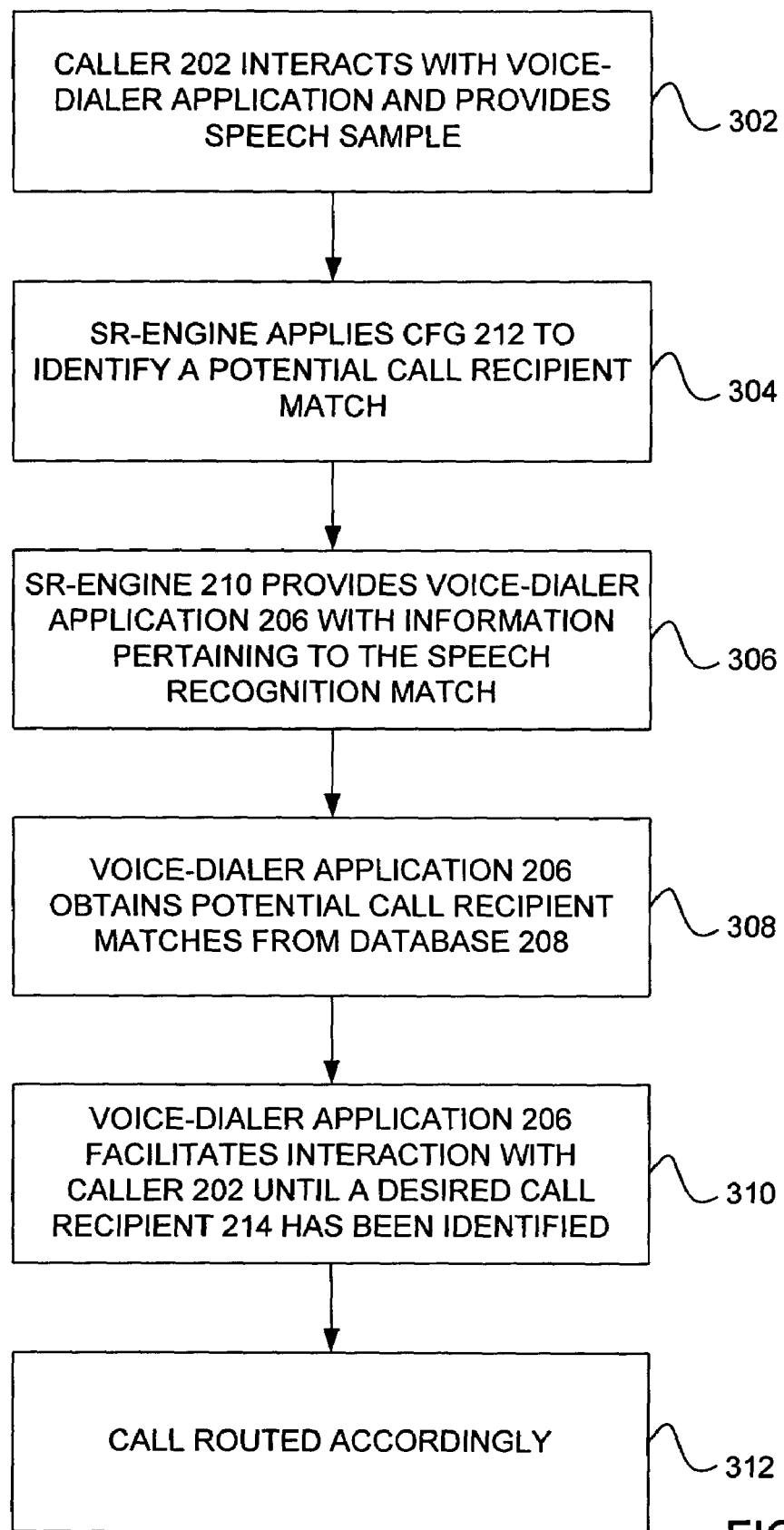
FIG. 3 is a block flow diagram illustrating steps associated with routing a call.

Generally speaking, callers 202 interact with system 204 in order to be routed to a particular call recipient 214. FIG. 3 is a block flow diagram illustrating steps associated with routing a call in accordance with one aspect of the present invention. In accordance with step 302, a caller 202 verbally interacts with voice-dialer application 206 (e.g., verbally communicates in response to recorded or speech-simulated voice prompts). During the interaction, the caller provides a speech sample representative of a desired call recipient 214. The speech sample is illustratively provided to speech recognition engine 210.

In accordance with step 304, speech recognition engine 210 applies CFG 212 in order to identify a potential speech recognition match that corresponds to a call recipient. In accordance with step 306, speech recognition engine 210 provides voice-dialer application 206 with information pertaining to the speech recognition match. In accordance with step 308, voice-dialer application 206 references the received information against a collection of potential call recipients listed in database 208. In accordance with block 310, voice-dialer application 206 communicates with the caller to facilitate confirmation and/or disambiguation as necessary to select a particular call recipient from database 208. Finally, in accordance with block 312, the call is appropriately routed from the caller 202 to a selected call recipient 214.

In order to support the described automated voice-dialer functionality, speech recognition engine 210 is provided with a list of words or phrases organized in a grammar, which in FIG. 2 is identified as CFG 212. The grammar illustratively contains a collection of representations of potentially recognizable words and/or phrases organized to support the speech recognition process. For example, phrases organized into the grammar might include representations of names such as Bill Thompson, Bruce Smith, Jack Taylor, etc. The words and/or phrases represented in CFG 212 illustratively correspond to a list of individuals identified within database 208, wherein each individual is a different potential call recipient (e.g., the database includes a different phone extension for each individual).

There is a reasonable possibility that database 208 will include more than one distinct individual with the same name (e.g., two people having the name Jane Smith wherein each individual is associated with a different employee identification number). There is also a reasonable likelihood that database 208 will include multiple individuals having a name with a common pronunciation but with different spellings (e.g., Mike Andersen and Mike Anderson). This latter scenario is a homonym scenario.

While CFG 212 does generally correspond to database 208, not every name in the database need necessarily be independently represented in the CFG. In the context of some known voice-dialing systems, the grammar applied by a speech recognition engine will not include distinct entries for multiple listings having the same spelling. For example, if the database includes four instances of "Mike Anderson", then only one of those instances needs to be incorporated into the grammar (primarily because the SR engine has traditionally been configured to return a single match result, which is referenced in the database for multiple text-based matches). The described merging of identical entries within the CFG does not address homonym ambiguity. Many known systems will include a separate entry in the CFG for every unique spelling of a name in the database, even if two names are spelled differently but pronounced the same.

Accordingly, in the context of many known voice-dialing systems, when an input from a caller is compared by a speech recognition engine to the associated grammar, a returned match could correspond to any one of multiple entries in the CFG having the same pronunciation (but different spellings). It is not uncommon for the input to be compared to multiple entries having the same pronunciation, regardless of the fact that only a single match indication will be returned. It is also not uncommon that the speech recognition engine will be configured to return a single match result regardless of the number of match instances in the grammar under analysis.

In accordance with one aspect of the present invention, the contents of the grammar delivered to, and applied by, the speech recognition engine are economized through a detection and consolidation of words and/or phrases demonstrating homonym characteristics.

B. Homonym Detection

In accordance with one embodiment, a word level homonym detection process is carried out prior to construction of the CFG grammar. Homonyms are identified based on the pronunciation of terms in database 208. Pronunciation of the terms is illustratively determined based on speech recognition (or text-to-speech) models and/or information stored in application lexicon dictionaries. Once homonyms have been identified, the grammar to be provided to the speech recognition engine can be economized through an elimination of homonym-based ambiguity. For example, supposing database 208 contains 50,000 names incorporating 42,000 words, it is likely that the corresponding grammar can be economized through a consolidation of homonym-oriented matches.

Figure 4:
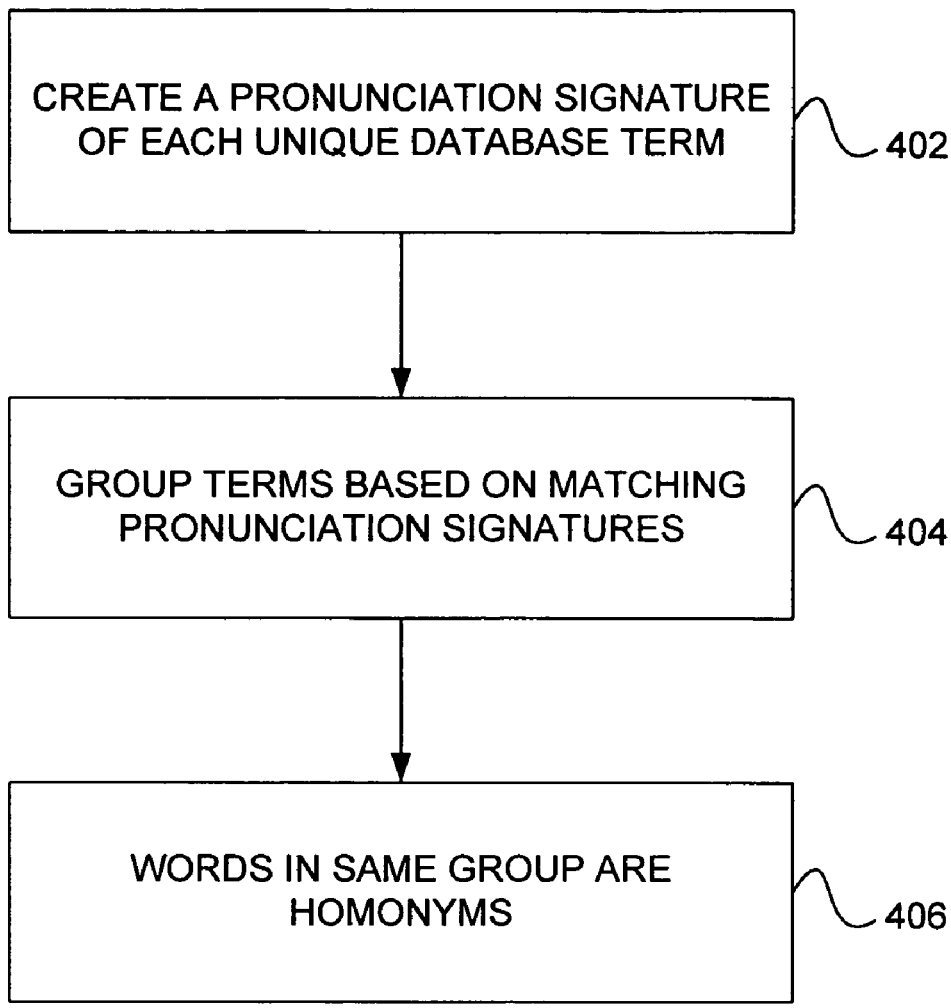
FIG. 4 is a block flow diagram illustrating steps associated with homonym identification.

FIG. 4 is a block flow diagram illustrating steps associated with homonym detection in accordance with one aspect of the present invention. As is indicated by block 402, a pronunciation signature is created for each database term. In accordance with one embodiment, a pronunciation signature is a distinct pronunciation for a given term. Pronunciation information can come from a variety of sources such as, but not limited to, an application dictionary or a speech recognition dictionary. A speech recognition dictionary illustratively includes common pronunciations of terms. An application dictionary illustratively includes more directly asserted pronunciations. For example, a term having a pronunciation listed in the speech recognition dictionary can have a different pronunciation listed in the application dictionary. This might be desirable, for example, if an individual's name is actually pronounced differently than the default listed in the speech recognition dictionary. In accordance with one embodiment, if a term is listed in the application dictionary, the pronunciation of that word specified in the speech recognition dictionary is ignored. In other words, pronunciations in the application dictionary are assumed to be more accurate and therefore take precedence. Accordingly, for every distinct term in the database, a query is made to retrieve an internal pronunciation from a speech recognition dictionary (or a user application lexicon that overrides the default speech recognition pronunciation).

In accordance with block 404, the next step in the homonym detection process is a grouping of terms based on matching pronunciation signatures. As is indicated by block 406, words in the same group assumedly contain the same set of pronunciations and are therefore considered homonyms. In other words, the union of all pronunciations is used as a key to group terms into homonym classes. All of the words in a same class will illustratively have the same pronunciation. As a result, they are interchangeable from the speech recognition point of view (e.g., one class might include "Mike Anderson" and "Mike Andersen", wherein both terms are identically pronounced). Terms that do not demonstrate a homonym nature will only have one entry in their class. Terms having a homonym nature will have more than one entry (multiple entries that are pronounced the same but spelled differently).

In accordance with one embodiment, a homonym replacement table is constructed by including a listing of terms that are associated with classes having a size greater than 1. The homonym replacement table illustratively includes one entry for each multiple-term class. The one entry is illustratively the most predominant spelling within the class. For example, for a class that includes three instances of "Jeff Smith" and one instance of "Geoff Smith", the homonym replacement table will include "Jeff Smith". In another example, for a class that includes two instances of "Michelle Wilson" and one instance of "Michele Wilson", the homonym replacement table will include simply "Michelle Wilson".

C. Grammar Consolidation

In accordance with one embodiment, the homonym replacement table is applied term by term as names are inserted into the context free grammar to be applied by the speech recognition engine within the voice-dialing system. For each set of pronunciations in a homonym class, only one unique term is incorporated into the CFG (assumedly the "most popular" term derived from the homonym replacement table). Accordingly, given the consolidation of terms having a homonym nature, the overall size of the CFG is reduced. Therefore, the overall quantity of reference resources required for speech recognition is generally reduced. The reduction in size of the CFG enables a reduction in the number of "fan outs" as compared to searching a CFG that incorporates homonym ambiguity.

In accordance with one embodiment, the memory resources freed up by homonym term elimination are invested in a provision of additional means for improving speech recognition performance in terms of accuracy and/or response time. For example, the speech recognition engine can be configured for greater accuracy because more memory becomes available for storing additional recognition hypotheses, thereby enabling a reduction in reliance on aggressive pruning for recognition purposes.

Figure 5:
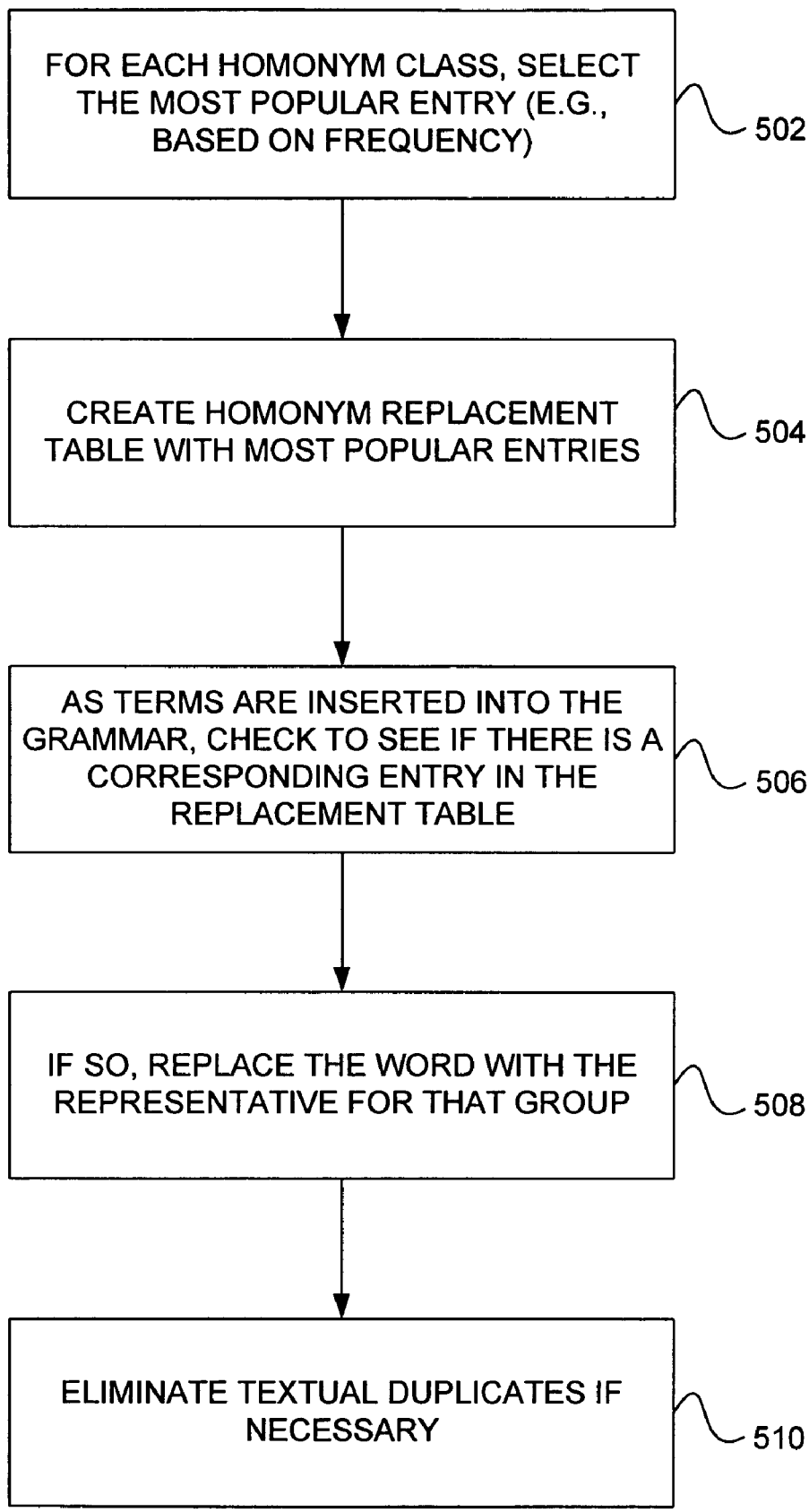
FIG. 5 is a block flow diagram illustrating steps associated with generation of a grammar.

FIG. 5 is a block flow diagram demonstrating one embodiment of the described economization of a CFG constructed for application within a voice-dialing system. In accordance with block 502, for each group of homonym terms (e.g., for each homonym class), the most popular entry (e.g., based on frequency) is selected as the representative of that group. In accordance with block 504, a homonym replacement table is created and includes the most popular form for each homonym class. Corresponding actual spelling forms of each homonym listed in the replacement table continues to be stored in the database.

As entries corresponding to database terms are added to the CFG, in accordance with block 506, a check is performed to see if a given database term is included in the replacement table. In accordance with block 508, if a term is included in the replacement table, then the term is replaced with the representative for that group. In accordance with block 510, terms having exact spellings are reduced to a single occurrence in the CFG if necessary.

In accordance with one embodiment, as original spellings of names are added to, or eliminated from, the database (e.g., as employees come and go), the homonym replacement table is re-populated and the speech recognition grammar is re-generated. In other words, when terms are added, replaced, and/or eliminated, the homonym replacement table is re-populated and the speech recognition grammar is re-generated. Similarly, when pronunciations are added, replaced, and/or eliminated (e.g., new pronunciation added to an application dictionary), the homonym replacement table is re-populated and the speech recognition grammar is re-generated. In accordance with one embodiment, re-population and/or re-generation is performed periodically, after a predetermined number of changes have occurred or every time a change occurs, depending on application preferences.

D. Conformation and Disambiguation

For many voice-dialing systems, it is common for a caller to be presented with an audio presentation of a name during a confirmation and/or disambiguation process. For example, a caller might be presented with an audio presentation of a phrase such as "Did you say Mike Anderson", which the caller can confirm or reject based on perceived accuracy. The homonym replacement table assumedly contains common spellings for each incorporated term demonstrating a homonym nature. Accordingly, the homonym replacement table represents an excellent source for the generation of the audio representations that are presented to a caller. Both automated and human-based generation of audio name representations are more likely to produce accurate pronunciations if provided with a common rather than uncommon spelling. If the audio representations are automatically generated, it is more likely that a common spelling will correspond to a common pronunciation. If the audio presentations are generated by a human voice actor, the actor is more likely to get the pronunciation correct if he or she is presented with a spelling with which they may already be familiar.

Regardless of whether name representations are derived automatically or through recording of a human voice, the work required to generate audio representations of all terms in a database is generally reduced in accordance with the present invention because only one pronunciation representation needs to be generated for each homonym term. In the case of audio representations generated by voice actors, this provides some level of increased privacy because the actor will likely be presented with only one homonym term without being made privy to the fact that there are multiple employees or individuals having the same name within the corresponding organization. Further, the actor is shielding from seeing every spelling the names of every individual within the organization.

Another aspect of the present invention pertains to confirmation and disambiguation processing. Once the speech recognition engine has returned a result based on an analysis of an input against the CFG, a general confirmation process begins, which may include disambiguation in instances of true collisions (multiple instances of the same spelling) or homonym collisions (multiple spellings but a common pronunciation). In accordance with one embodiment, true collisions and homonym collisions are initially treated the same way in terms of confirmation/disambiguation. For example, possible name collisions resulting from homonyms (e.g., "John Reid" and "John Reed") are initially merged into regular name collisions and distinct pronunciations are initially presented to the caller in the form of a confirmation dialogue (e.g., "Did you say John Reed"). Once a pronunciation has been confirmed, then disambiguation is performed if necessary. For homonym collisions, spelling information is illustratively utilized as a basis for conducting disambiguation (e.g., "Would you like John R-E-I-D" or "John R-E-E-D").

Accordingly, in accordance with one aspect of the present invention, the confirmation dialogue initially presents a unique pronunciation for caller confirmation. Because this is true, the caller will not first be confronted with a confusing and ambiguous phrase such as "I have two names for you to choose from: 1. John Reid and 2. John Reed". Instead, the initial confirmation will simply be in the nature of "Did you say John Reed".

Figure 6:
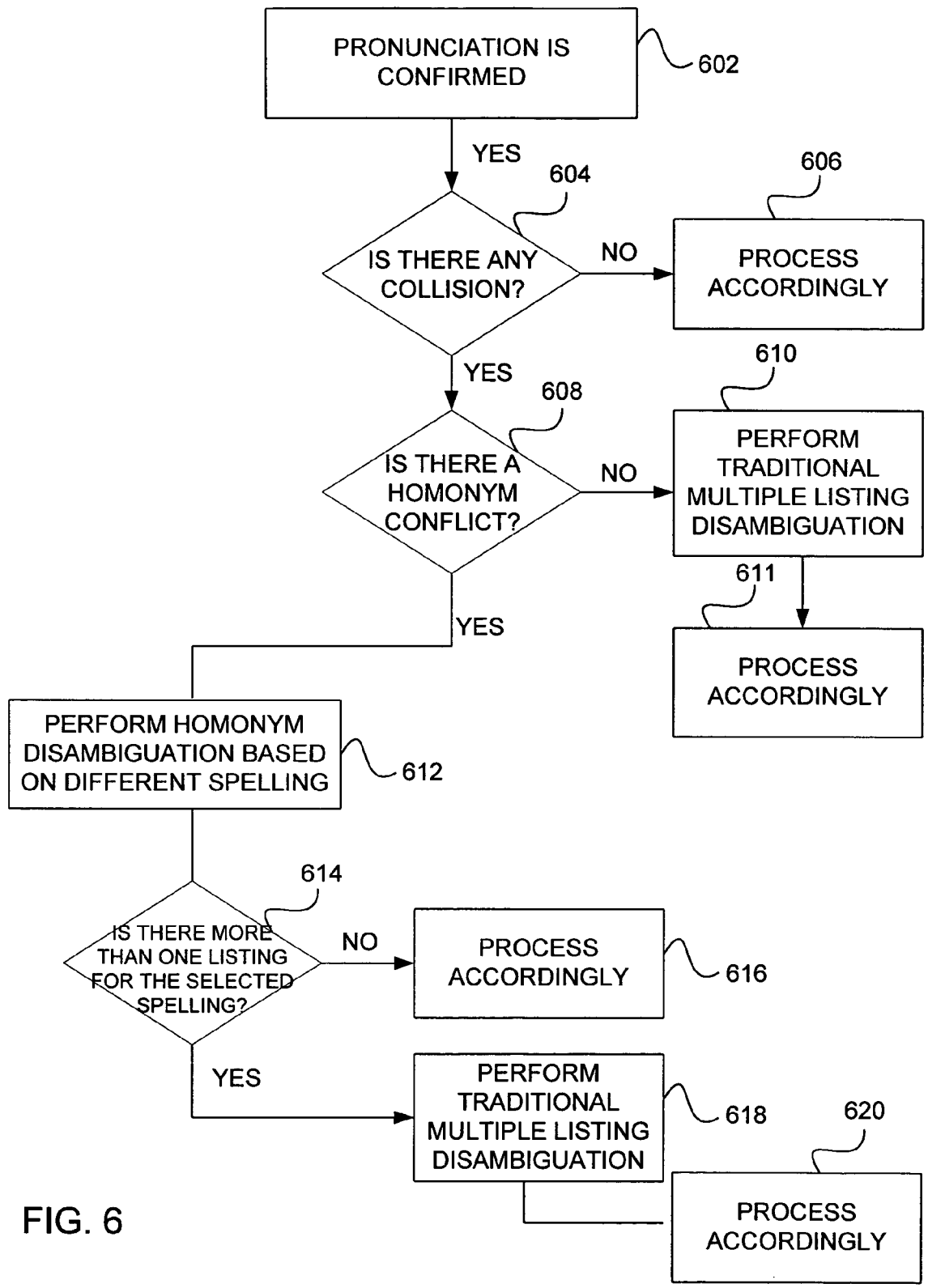
FIG. 6 is a block flow diagram illustrating steps associated with confirmation and disambiguation.

FIG. 6, in accordance with one aspect of the present invention, is a block flow diagram representing a confirmation and disambiguation process. As is indicated by block 602, the process begins with a simple confirmation of pronunciation (e.g., "Did you say John Reed"). As is indicated by block 604, there is then a determination as to whether there is any collision. As is indicated by block 606, if there is not any collision, then processing (e.g., call routing based on the selected database entry) can occur immediately.

As is indicated by block 608, if there is a collision then a determination is made as to whether there is a homonym conflict or a true collision. In accordance with one embodiment, homonym conflicts are identified through reference to the homonym replacement table. If there is no homonym conflict, then, in accordance with block 610, some form of traditional true collision disambiguation is conducted (e.g., "Would you like John Andersen in building 6 . . . or John Andersen in building 9"). In accordance with block 611, processing of the call is executed in accordance with the disambiguation result (i.e., in accordance with selection preferences indicated by the caller).

If there is a homonym conflict, as is indicated by block 612, a homonym disambiguation process can be executed based on different spellings ("Would you like John R-E-I-D or John R-E-E-D"). As is indicated by block 614, there is then a determination as to whether a spelling selected by the caller corresponds to multiple listings (i.e., a true collision). If not, in accordance with block 616, processing is executed in accordance with the caller's expressed selection. If a true collision is encountered, then, in accordance with block 618, some form of traditional true collision disambiguation is conducted (e.g., similar to block 610) and, in accordance with block 620, processing of the call is executed accordingly.

E. Quasi-Homonyms

Another aspect of the present invention pertains to "quasi-homonyms", which are illustratively defined as a set of terms having a same pronunciation, wherein one of the terms also has a second pronunciation that is not the same as compared to the other member or members of the set. In other words, a quasi-homonym is an instances wherein multiple terms with different spellings have a consistent pronunciation (i.e., homonym nature) but at least one of the listings has a unique pronunciation. For example, the word "Stephen" can be pronounced as either "s tee ven" or "stef an", while the word "Steven" has only one pronunciation ("s tee ven"). Because Stephen and Steven are not straight homonyms, they generally should not be merged within the context free grammar.

In accordance with one aspect of the present invention, the problems presented by quasi-homonyms to a voice-dialing system are addressed within the context of the other embodiments described herein. By skipping the common practice of "word level" recognition of names and detecting homonyms at the individual pronunciation level, both homonyms and quasi-homonyms can be detected. Once detected, a voice-dialing system can be configured to efficiently and accurately handle the quasi-homonym scenario. For example, when a caller indicates the pronunciation "s tee ven", the system assumes the caller wants either "Steven" or "Stephen". However, when the caller indicates the pronunciation "stef an", then system is configured to recognize that the caller wants "Stephen" but not "Steven".

One aspect of the present invention pertains to quasi-homonym detection. As has been described previously, the present invention provides a system wherein homonym words of each unique pronunciation are detected and identified based on speech recognition internal pronunciations and application lexicon dictionaries. As has been described, a homonym replacement table can be constructed. In accordance with one embodiment, a quasi-homonym replacement table is created for grammar mapping purposes (e.g., for mapping Stephen to "s tee ven; stef an", and Steven to "s tee ven" within the speech recognition grammar). For example, consider a scenario wherein the system is presented with 7 words (A-G) and 6 unique pronunciations (P1-P6), wherein the pronunciation dictions is distributed as follows:

TABLE 1

| Word | Pronunciations |
|------|----------------|
| A | P1 |
| B | P1, P2 |
| C | P2, P3 |
| D | P3 |

TABLE 1-continued

| Word | Pronunciations |
|---|---|
| E | P4 |
| F | P4 |
| G | P5, P6 |

The corresponding quasi-homonym replacement table will illustratively look like:

TABLE 2

| Word | Pronunciations |
|---|---|
| A | P1 |
| B | P1, P2 |
| C | P2, P3 |
| D | P3 |

Because words E and F are regular homonyms, they do not appear in TABLE 2. Although word G has two pronunciations, it is not included in TABLE 2 because none of its pronunciations are shared with another word.

Another aspect of the present invention pertains to a formatting of the CFG to handle a quasi-homonym scenario. In accordance with one embodiment, terms included in the quasi-homonym replacement table are replaced with pronunciations, which are themselves placed within the CFG. Once provided with pronunciation information in quasi-homonym scenarios, the CFG is equipped to support identification of which quasi form has been presented. In accordance with one embodiment, substitution of pronunciations that correspond to the quasi-homonym replacement table is in addition to application of the homonym replacement table (described in relation to other embodiments) wherein consolidation of terms within the context free grammar is accomplished for regular homonyms. For example, consider a scenario wherein there are 9 employees (E1-E9) in a database as follows:

TABLE 3

| Employee | Name |
|---|---|
| E1 | A |
| E2 | A |
| E3 | B |
| E4 | C |
| E5 | C |
| E6 | D |
| E7 | E |
| E8 | F |
| E9 | G |

The full name table corresponding to the grammar to be applied by the speech recognition engine within the voice-dialing system illustratively looks like:

TABLE 4

| Full Name | Employee |
|---|---|
| P1 | E1, E2, E3 |
| P2 | E3, E4, E5 |
| P3 | E4, E5, E6 |
| E | E7, E8 |
| G | E9 |

Since P1 (pronunciation 1) is shared between word A and B, Employees E1, E2, and E3 are added to the record of P1. The word E and F are regular homonyms so the word F is replace by word E in the system and that is why employees E7 and E8 are associated with the name E. Names E and G are not listed on the pronunciation level because it is more efficient for the speech recognition engine to work with words when possible.

Figure 7:
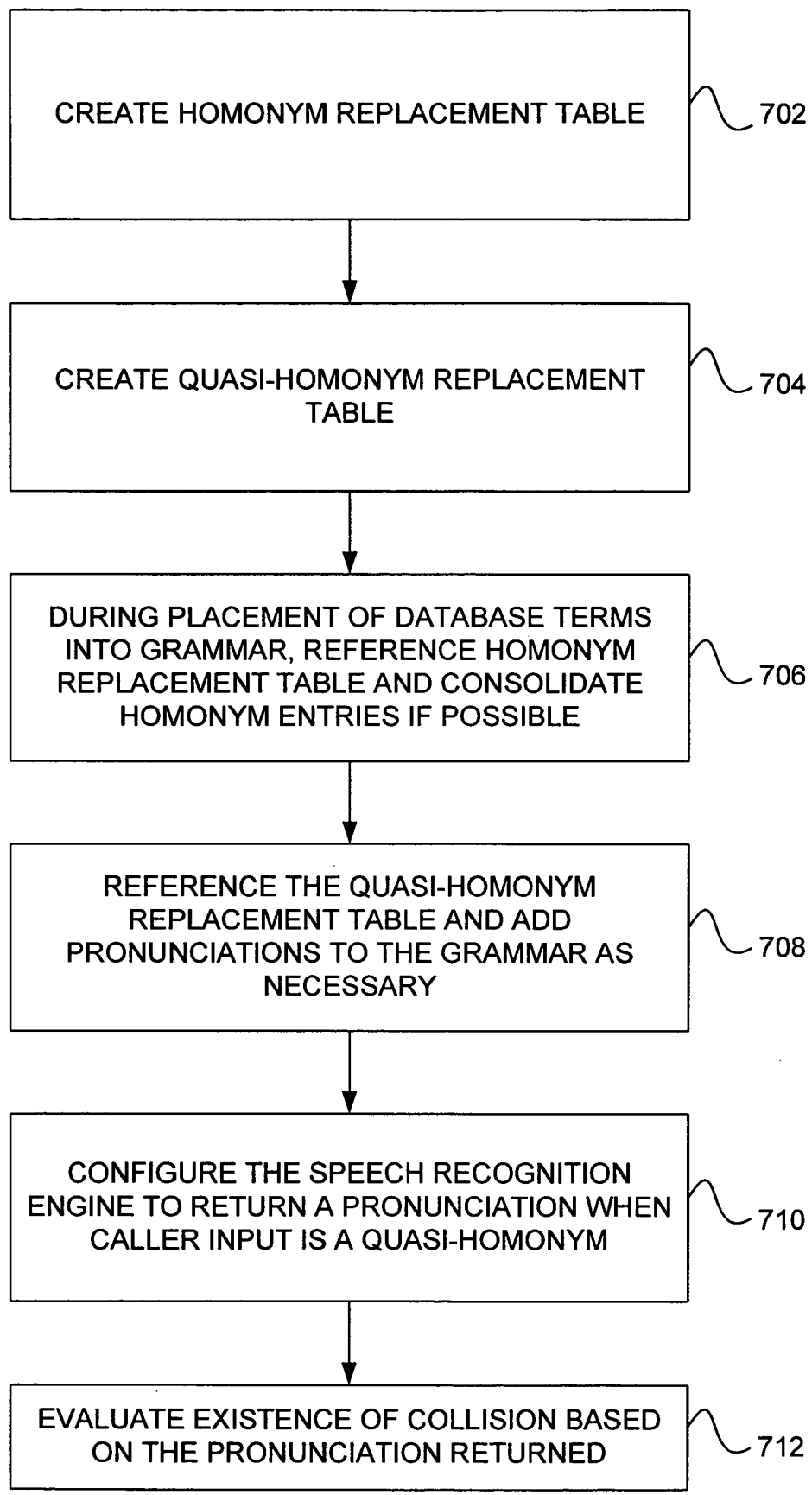
FIG. 7 is a block flow diagram illustrating steps associated with the processing of quasi-homonyms.

FIG. 7, in accordance with one aspect of the present invention, is a block flow diagram demonstrating steps associated with identifying and processing quasi-homonyms. The process illustratively begins with homonym detection, for example, as illustrated and discussed in relation to FIG. 4. A result of the homonym detection is illustratively a collection of terms divided into classes, wherein terms within each class generally demonstrate matching pronunciation signatures and are therefore considered homonyms. As is indicated by block 702, a homonym replacement table is created to identify classes having a homonym nature (pronunciation classes having more than one term with different spellings). The homonym replacement table illustratively indicates the most "popular" form or spelling for each homonym pronunciation. When multiple terms with different spellings appear in both a same and different pronunciation class, then this is an indication of a quasi-homonym. In accordance with block 704, quasi-homonym replacement table is created to catalogue identified quasi-homonyms for subsequent processing.

As terms are placed into the grammar, a check is performed against the homonym replacement table. In accordance with block 706, if a term is included in the homonym replacement table, then it is the "popular" representation or spelling for that term that is placed into the grammar (duplicate spelling are eliminated from the grammar if necessary). Before the grammar is consolidated based on a homonym entry, in accordance with block 708, an additional check is performed against the quasi-homonym replacement table. If a term is in the quasi-homonym table, then the different pronunciations are added to the grammar rather than an entry in word form.

As is indicated by block 710, when a quasi-homonym input is compared to the CFG during operation of the voice-dialing system, the results of the speech recognition process will be tailored to the particular pronunciation of the input (e.g., if the input is "stef an", then the outcome of the speech recognition process will not be "Steven"). In accordance with block 712, subsequent conformation and disambiguation will be based on an analysis of collisions in light of the particular returned form of the quasi-homonym.

In the context of examples described above, if a caller input is consistent with a pronunciation of "Stephen" with a "stef an" pronunciation, then only "Stephan" is considered for subsequent conflict detection and disambiguation processing (i.e., as described in relation to FIG. 6). The CFG will support return of a result consistent with the pronunciation received. On the other hand, if the caller input is consistent with "Steven" pronounced "s tee ven", then, as has been described, entries consistent with both "Steven" and "Stephen" will be calculated into the conformation and disambiguation process. The CFG will return a result consistent with the pronunciation received.

Although the present invention has been described with reference to particular embodiments, workers skilled in the art will recognize that changes may be made in form and detail without departing from the spirit and scope of the invention.

What is claimed is:

1. A method for constructing a grammar to be processed by a speech recognition engine in the context of a voice-activated command system, the method comprising:
   receiving a database containing a plurality of terms;
   identifying a set of terms from said plurality that are pronounced the same but spelled differently; and
   placing a reduced number of terms within the grammar to represent said set of terms wherein the reduced number of terms is fewer than the number of terms in the set of terms.

2. The method of claim 1, wherein placing a reduced number of terms within the grammar comprises placing a single term selected from the set of terms.

3. The method of claim 1, wherein placing a reduced number of terms within the grammar comprises placing a single term selected from the set of terms as a popular spelling.

4. The method of claim 1, wherein identifying a set of terms comprises obtaining a pronunciation for each of the plurality of terms in the database.

5. The method of claim 4, wherein identifying a set of terms further comprises organizing the plurality of terms into a plurality of pronunciation classes, wherein each pronunciation class corresponds to a distinct pronunciation, and wherein one class corresponds to said set of terms.

6. The method of claim 4, wherein obtaining a pronunciation comprises obtaining a pronunciation from a speech recognition dictionary.

7. The method of claim 4, wherein obtaining a pronunciation comprises obtaining a pronunciation from an application dictionary.

8. The method of claim 1, wherein placing a reduced number of terms within the grammar comprises placing a single spelling of a name within the grammar to represent a set of terms having homonym characteristics.

9. The method of claim 1, wherein identifying a set of terms comprises identifying a set of words having homonym characteristics.

10. A computer-implemented method for accomplishing disambiguation in the context of a voice-activated command system, the method comprising:
    providing an input to a speech recognition engine for processing relative to a grammar that corresponds to a database containing a plurality of terms;
    receiving from the speech recognition engine an output related to the input and corresponding to a first one of the plurality of terms wherein the output includes a spelling of a person's name;
    identifying, based at least in part on the output, a second one of the plurality of terms that is pronounced the same as the first but is spelled differently;
    utilizing the spellings of the first and second terms as one basis for distinguishing between the first and second terms during a disambiguation process; and
    wherein providing an input to a speech recognition engine for processing relative to a grammar comprises providing an input to a speech recognition engine for processing relative to a grammar that contains a single entry for each pronunciation reflected in the database.

11. The method of claim 10, wherein utilizing the spellings comprises utilizing the spellings as one basis to determine which of the first and second terms should be selected for subsequent processing.

12. The method of claim 11, wherein said output is the first one of the plurality of terms.

13. The method of claim 10, wherein providing an input to a speech recognition engine comprises receiving a speech input and providing a representation of the speech input to the speech recognition engine.

14. The method of claim 13, wherein receiving a speech input comprises receiving a speech input from a caller.

15. The method of claim 14, wherein receiving a speech input comprises receiving a spoken name.

16. The method of claim 10, wherein receiving an output comprises receiving a textual representation of a person's name.

17. The method of claim 10, wherein identifying a second one of the plurality of terms comprises referencing a homonym replacement table.

18. The method of claim 10, wherein utilizing the spellings for distinguishing comprises:
    presenting the spellings of the first and second terms to a caller;
    receiving an input from the caller corresponding to one of the first and second terms; and
    selecting for subsequent processing the one of the first and second terms that corresponds to the input.

19. A speech recognition system comprising:
    a context free grammar that includes a representation of a plurality of database terms including a representation of a first database term but not a second database term, the first and second database terms having a common pronunciation but a different spelling; and
    a speech recognition engine that utilizes the context free grammar as a basis for identifying a voice-activated command.

* * * * *